United States Patent
Bhakar

(10) Patent No.: US 9,886,290 B2
(45) Date of Patent: *Feb. 6, 2018

(54) COMPONENT LOADING BASED ON USER PREFERENCES

(71) Applicant: Microsoft Corporation, Redmond, WA (US)

(72) Inventor: Gautam Bhakar, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 138 days.

This patent is subject to a terminal disclaimer.

(21) Appl. No.: 13/918,583

(22) Filed: Jun. 14, 2013

(65) Prior Publication Data

US 2014/0280573 A1  Sep. 18, 2014

Related U.S. Application Data

(60) Provisional application No. 61/779,861, filed on Mar. 13, 2013.

(51) Int. Cl.
| | | |
|---|---|---|
| *G06F 9/445* | (2006.01) | |
| *H04L 12/58* | (2006.01) | |
| *G06F 9/44* | (2006.01) | |

(52) U.S. Cl.
CPC ............ *G06F 9/445* (2013.01); *G06F 9/4401* (2013.01); *H04L 51/22* (2013.01)

(58) Field of Classification Search
CPC ..... H04L 29/06; H04L 65/403; H04L 63/083; H04L 67/02; H04L 67/1097; H04L 51/22; G06F 9/445; G06F 9/4401

USPC .......... 709/202, 203–245; 726/22, 8
See application file for complete search history.

(56) References Cited

U.S. PATENT DOCUMENTS

| | | | |
|---|---|---|---|
| 7,761,531 B2* | 7/2010 | Johnson | H04L 63/029 709/217 |
| 2004/0037259 A1* | 2/2004 | Steinberg | H04L 12/589 370/338 |
| 2006/0123346 A1* | 6/2006 | Totman | G06F 17/24 715/748 |
| 2006/0259585 A1* | 11/2006 | Keohane et al. | 709/219 |
| 2007/0192329 A1* | 8/2007 | Croft | G06F 3/1415 |
| 2008/0263192 A1* | 10/2008 | Murphy | G06F 17/30067 709/223 |
| 2009/0112975 A1* | 4/2009 | Beckman et al. | 709/203 |
| 2010/0115613 A1* | 5/2010 | Ramaswami et al. | 726/22 |
| 2011/0106916 A1* | 5/2011 | Cho | G06F 9/5027 709/219 |
| 2012/0120799 A1* | 5/2012 | Brisebois | H04W 4/001 370/231 |
| 2014/0310395 A1* | 10/2014 | Chakra | H04L 67/22 709/224 |

* cited by examiner

*Primary Examiner* — David Lazaro
*Assistant Examiner* — Berhanu Shitayewoldetsad

(57) ABSTRACT

Provided herein are systems, methods, and software for facilitating information exchange services. In at least one implementation, a request originated from an execution environment is received at an application source. The request is a request to load an application in the execution environment from the source. A user associated with the request is identified and a script is generated based on loading preferences associated with the user. The script is then communicated to the execution environment so that the application can be loaded in accordance with the preferences.

20 Claims, 7 Drawing Sheets

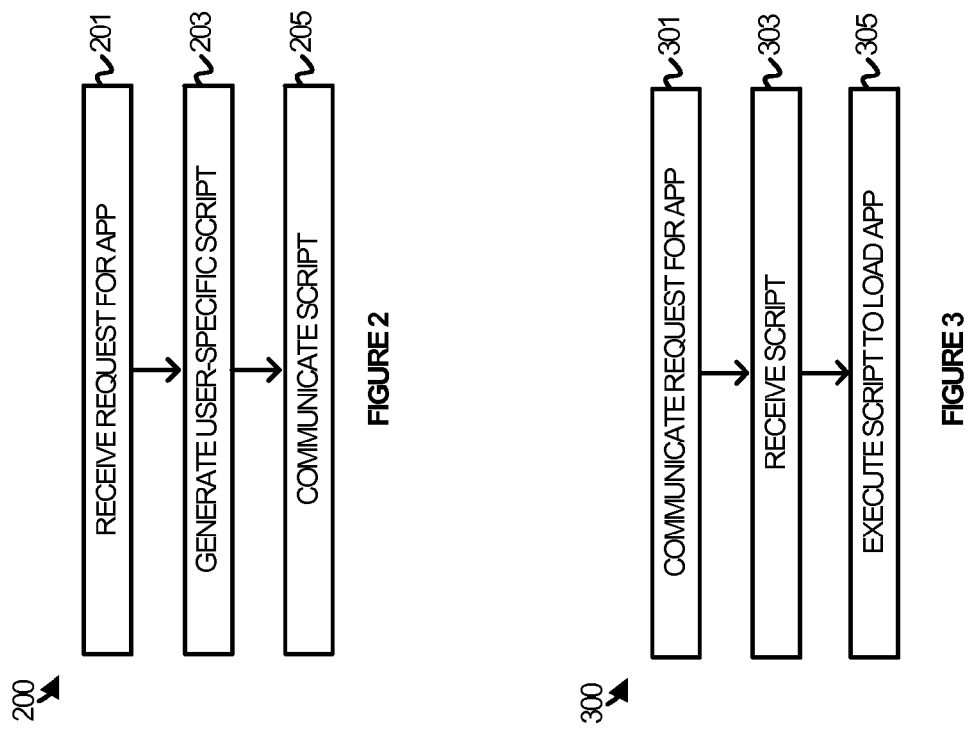
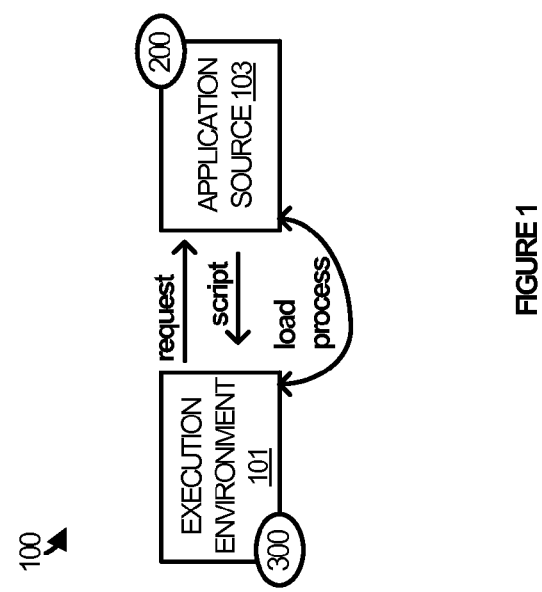

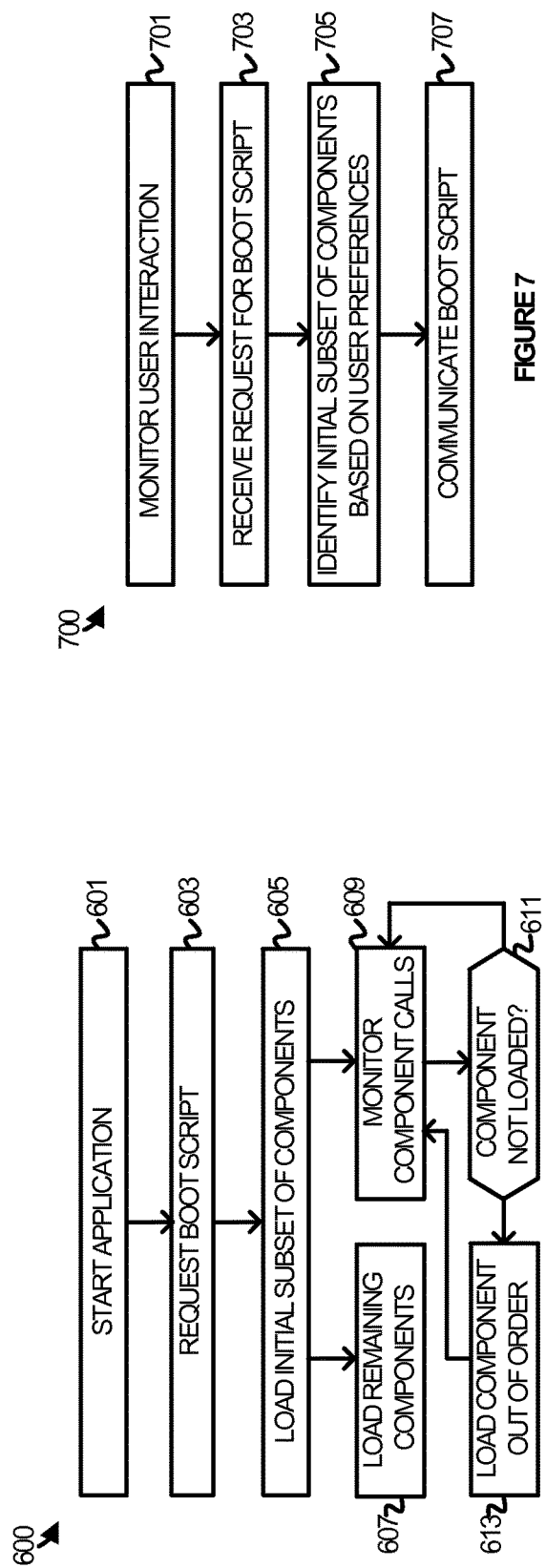

COMPONENT LOADING BASED ON USER PREFERENCES

RELATED APPLICATIONS

This application claims the benefit of and priority to U.S. Provisional Patent Application No. 61/779,861, filed on Mar. 13, 2013, and entitled "USER-SPECIFIC LOADING PROCESSES," which is hereby incorporated by reference in its entirety.

TECHNICAL FIELD

Aspects of the disclosure are related to computing hardware and software technology, and in particular to information management applications.

TECHNICAL BACKGROUND

Information management applications provide users with effective and convenient ways to communicate with others and manage their information. Examples of information management applications include but are not limited to email applications and calendar applications. Some information management applications integrate these various types of applications by way of modules, such as email, calendar, contact, and task modules, although each type of application or functionality may also be provided in a stand-alone manner. Microsoft® Outlook® is one example of an information management application.

While many information management applications are provided as locally installed and executed applications, many can be experienced in a wide variety of ways. For example, some information management applications are available as web-based applications that are experienced through a browser application, as mobile applications customized for mobile environments, or even as a mobile web-based application generally developed for a mobile browser experience. In addition, information management applications can be experienced on a wide variety of computing devices, such as desktop, laptop, or tablet computers, mobile phones, gaming systems, Internet appliances, or any other physical or virtual computing system, variation, or combination thereof.

In some scenarios, an information management application is first loaded into an execution environment, such as a web browser running on a computing device, before a user can begin to interact with it. In some cases an entire module, such as an email or calendar module, must be loaded before any of its components can be used. In other cases all of the modules must be loaded before any module or component can be used.

For example, a web-based version of an information management application may be invoked, triggering the loading of its components within a browser or other similar environment. A splash screen or other delay feature may be presented that keeps a user from interacting with the application until all of its components or modules are loaded. This degrades the user experience in general and can lead to some operational errors if the loading process is compromised or inhibited in some manner.

One benefit of loading all of the components of an application into an execution environment is that, once all of the components are loaded, interaction with any given aspect of the application may be fast and responsive. For example, a user may click on a contact from within a view of an email. In response to selecting the contact, a contact card can be displayed that includes information about the contact and various elements that can be selected to access various features and functionality. By loading all of the components associated with the elements in the contact card without restraint, the features and functionality can be experienced without significant delay. But as mentioned above, such a technique can degrade the user experience with respect to the application.

OVERVIEW

Provided herein are systems, methods, and software for implementing information management applications in which an initial set of components in an application are identified for loading prior to other components based at least in part on user preferences associated with the application. In this manner, specific aspects of an application can be loaded before others that may be less relevant to a user, thus enhancing the user experience.

In at least one implementation, an information management application interfaces with an information exchange service and, upon starting, communicates a request to the information exchange service to identify an initial subset of various components based at least in part on a user preference. In response to the information exchange service identifying the initial subset of components, the information management application loads the initial subset of components into an execution environment. In some implementations, the execution environment comprises a browser.

This Overview is provided to introduce a selection of concepts in a simplified form that are further described below in the Technical Disclosure. It should be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

FIG. 1 illustrates an operational scenario in an implementation.

FIG. 2 illustrates a loading process in an implementation.

FIG. 3 illustrates a loading process in an implementation.

FIG. 6 illustrates a loading process in an implementation.

FIG. 7 illustrates an exchange process in an implementation.

TECHNICAL DISCLOSURE

Figure 4:
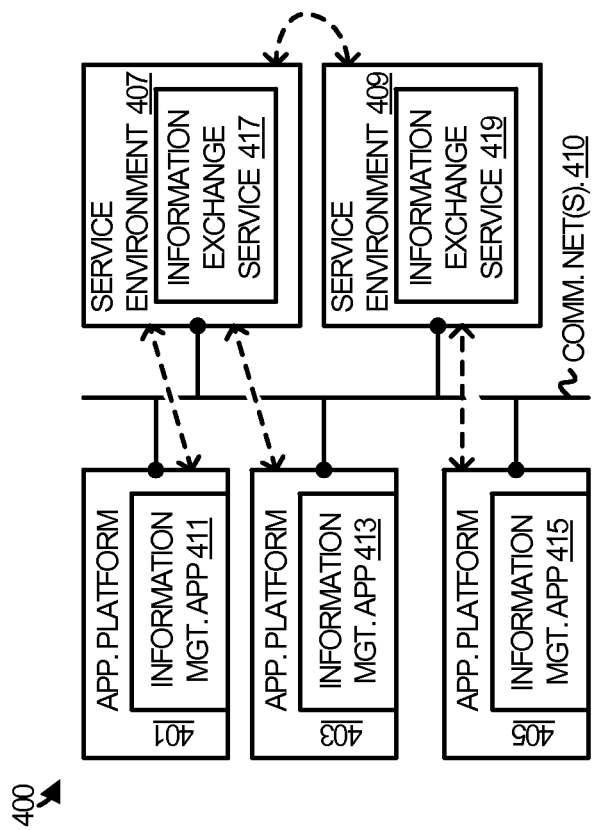
FIG. 4 illustrates a communication environment in an implementation.

Implementations disclosed herein include information management applications that load components in a user-specific manner to enable faster and more responsive user experiences. Rather than load all of the components upon starting the application, an initial set of the components may be identified for early loading ahead of a remaining set of the components. The initial set may be identified based on a variety of factors, such as user preferences established with respect to the application. For example, a user may establish viewing preferences with respect to an email module of an information management application, such whether or not to present a viewing pane or whether to present an inbox in a conversation mode or a list mode. Other user preferences are possible and may be considered within the scope of the present disclosure.

These and other user preferences can be saved on a server so that the next time the user engages with the application, the application loads in accordance with that preference. In addition, rather than simply load the entire application and then apply the preferences, a variation is accomplished that speeds up the user's encounter with her preferences. In general, such a preference is associated with a component or components of the application that must be loaded. Rather than loading in the entire application in a pre-determined manner, loading of the various components can be ordered such that those associated with at least some preferences are given priority over others.

Using the examples above for illustrative purposes, both the conversation mode preference and the list mode preference are implemented by way of various components that must be loaded. In various scenarios, the components associated with the conversation mode preference can be loaded ahead of the components associated with the list mode preference. In other words, the loading of conversation mode components can be prioritized over at least some other components. In this manner, a user's preferences will be loaded more quickly than otherwise.

FIG. 1 illustrates one operational scenario involving an execution environment 101 and an application source 103 in an implementation. Examples of execution environment 101 include various devices and software programs discussed in more detail with respect to FIG. 4 and FIG. 5. Examples of application source 103 include server computers and other suitable systems for providing an application, such as a browser application or browser cache associated with the browser application.

In operation, execution environment 101 communicates a request to load an application from application source 103. For example, a web browser may communicate a request to launch an application to a web server. In another example, a mobile application may communicate such a request.

Application source 103 receives the request and identifies a user associated with it. For example, a user may be associated with a device making the request, a user may have signed-in to a service, or a user may be identified in some other way. Preferences associated with the user are then determined and a script is generated based on the preferences. Application source 103 communicates the script to execution environment 101, which then executes the script to load the application. The script directs the execution environment 101 to retrieve the components in accordance with an order that gives priority to the user's preferences. The components may be retrieved from the application source 103 or from some other location. In other words, while the application source 103 may determine which components to load first, the components may be retrieved the same application source 103 or from some other source, such as another server or a browser cache.

FIG. 2 illustrates a representative loading process 200 that may be implemented by an application source, such as a web server. In operation, the application source receives request for an application (step 201). The application source identifies a user associated with the request. For example, the user may be identified in the request. The application source then generates a script that is customized for that user and is used by an execution environment to load the application (step 203). The application source communicates the script to the execution environment (step 205), which then proceeds to execute the script when loading the application.

FIG. 3 illustrates a representative loading process 300 that may be implemented by an execution environment, such as a personal computer, laptop, tablet computer, mobile phone, gaming device, or any other suitable application platform. In operation, an execution environment communicates a request to an application source for an application (step 301). The request may identify a user, in some scenarios. Per loading process 200, the application source generates and communicates a script, which is received by the execution environment (step 303). The execution environment then executes the scrip to load the application (step 305).

FIG. 4 illustrates a communication environment 400 in which various information exchange services may implement loading process 200 and in which various information management applications may implement loading process 300. Communication environment 400 includes application platform 401, application platform 403, and application platform 405. Application platform 401 and application platform 403 may communicate with service environment 407 to access information exchange service 417 on behalf of information management application 411 and information management application 413 respectively. Application platform 405 may communicate with service environment 409 to access information exchange service 419 on behalf of information management application 415. From time to time, service environment 407 and service environment 409 may communicate in furtherance of interaction between information exchange service 417 and information exchange service 419

Examples of application platforms 401, 403, and 405, include, but are not limited to, desktop computers, work stations, laptop computers, notebook computers, tablet computers, mobile phones, personal digital assistances, media devices, gaming devices, and any other physical or virtual computing machine or combinations and variations thereof capable of implementing at least one of a variety of information management applications. Service environment 407 may be any computing system or collection of computing systems capable of implementing an information exchange service 417.

Figure 5:
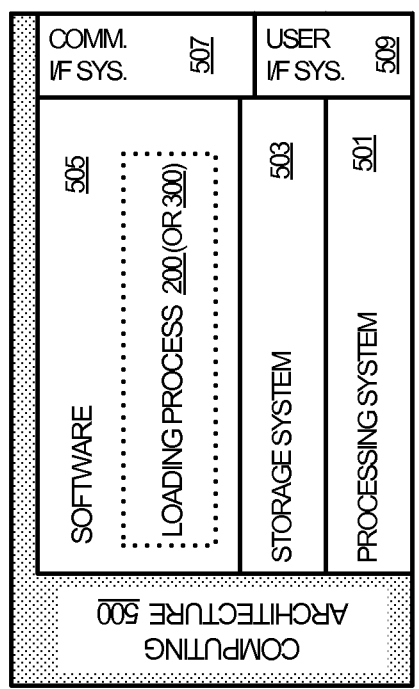
FIG. 5 illustrates a computing architecture in an implementation.

Application platforms 401, 403, and 405 may each be any computing apparatus, system, device, or collections thereof that employ a computing architecture suitable for implementing information management application 411, 413, or 415 respectively. Computing architecture 500 referred to with respect to FIG. 5 is one such representative architecture. Information management applications 411, 413, and 415 may each be any version or variety of an information management application. Examples include but are not limited to locally installed and executed applications, streaming applications, web-based applications that execute at least in part within the context of a browser application, mobile applications, mobile web-based applications that execute at least in part within the context of a mobile browser application, or any other application type, variation, or combination thereof.

Information management applications 411, 413, and 415 may each be embodied in program instructions that, when executed by application platforms 401, 403, and 415 respectively direct each to operate as described herein for loading process 300 discussed with respect to FIG. 2. The program instructions may take the form of compiled object code, interpreted scripts, or any other suitable form of program instructions that may be executed directly or indirectly by an application platform, as well as any suitable variation or combination thereof. Examples of information management applications include but are not limited to Microsoft® Outlook®, Mozilla Thunderbird/Lightening, Open-Xchange, Microsoft® Outlook® Web App, Microsoft® Outlook® Web App for mobile device, Outlook.com®, Gmail, and Microsoft® Outlook® for mobile devices, as well as another suitable information management application, variation, or combination thereof.

Service environment 407 and service environment 409 may each include any computing apparatus, system, device, or collections thereof that employ a computing architecture suitable for implementing information exchange service 417 and information exchange service 419 respectively. Computing architecture 500 referred to with respect to FIG. 5 is one such representative architecture. Examples include server computers, cloud computing platforms, data centers, and any physical or virtual computing machine, as well as any variation or combination thereof. Examples of information exchange service 417 and information exchange service 419 include but are not limited to Microsoft® Exchange®, Microsoft® O365®, Hotmail®, Outlook.com®, and Gmail, as well as any other information exchange service, combination, or variation thereof capable of operating as described herein.

In operation, any of application platforms 401, 403, and 405 may communicate from time to time with service environment 407 or service environment 409 over communication network 410 to facilitate the exchange of information between information management applications 411 and 413 and information exchange service 417 and between information management application 415 and information exchange service 419. Service environment 407 and service environment 409 may also communicate over communication network 410 to facilitate the exchange of information.

Communication between any of the elements contemplated in FIG. 4 may occur in accordance with various communication protocols, such as the Internet protocol (IP, IPv4, IPv6, etc.), the transfer control protocol (TCP), and the user datagram protocol (UDP), as well as any other suitable communication protocol, variation, or combination thereof. Communication network 410 may be representative of a network or collection of networks over which the element contemplated in FIG. 4 may exchange information, such as an intranet, the Internet, a local area network, a wide area network, a wireless network, a wired network, or any combination or variation thereof. Communication network 410 may include connections, devices, and communication media, such as metal, glass, air, or any other suitable communication media over which information may be exchanged. The aforementioned communication media, network, connections, protocols, and devices are well known and need not be discussed at length here.

The manner and format in which information is exchanged may vary. In some implementations, an application may exchange information with a service environment and information exchange service in accordance with various protocols, such as IMAP (internet message access protocol), POP (post office protocol), SMTP (simple mail transfer protocol), OWA (Outlook Web App) webmail protocol, various other webmail protocols, various proprietary protocols, HTTP (hypertext transfer protocol), REST (representational state transfer), WebSocket, DOM (Document Object Model), HTML (hypertext markup language), CSS (cascading style sheets), HTML5, XML (extensible markup language), Javascript, JSON (Javascript Object Notation), and AJAX (Asynchronous Javascript and XML), as well as any other suitable protocol, variation, or combination thereof.

Referring now to FIG. 5, computing architecture 500 is representative of an architecture that may be employed in any apparatus, system, or device, or collections thereof, to suitably implement all or portions of loading process 200 illustrated in FIG. 2 or variations thereof, or loading process 300 illustrated in FIG. 3 or variations thereof, and optionally all or portions of the information management application referred to with respect to FIG. 1. Loading process 200 or 300 may be implemented on a single apparatus, system, or device or may be implemented in a distributed manner. The information management application may also be implemented on a single apparatus, system, or device or may be implemented in a distributed manner. Loading process 300 may be integrated with the information management application, but may also stand alone or be embodied in some other application.

Computing architecture 500 may be employed in, for example, desktop computers, laptop computers, tablet computers, notebook computers, mobile computing devices, cell phones, media devices, and gaming devices, as well as any other type of physical or virtual computing machine and any combination or variation thereof. Computing architecture 500 may also be employed in, for example, server computers, cloud computing platforms, data centers, any physical or virtual computing machine, and any variation or combination thereof.

Computing architecture 500 includes processing system 501, storage system 503, software 505, communication interface system 507, and user interface system 509. Processing system 501 is operatively coupled with storage system 503, communication interface system 507, and user interface system 509. Processing system 501 loads and executes software 505 from storage system 503. When executed by processing system 501, software 505 directs processing system 501 to operate as described herein for loading process 200 or 300 or their variations. Computing architecture 500 may optionally include additional devices, features, or functionality not discussed here for purposes of brevity.

Referring still to FIG. 5, processing system 501 may comprise a microprocessor and other circuitry that retrieves and executes software 505 from storage system 503. Processing system 501 may be implemented within a single processing device but may also be distributed across multiple processing devices or sub-systems that cooperate in executing program instructions. Examples of processing system 501 include general purpose central processing units, application specific processors, and logic devices, as well as any other type of processing device, combinations, or variation.

Storage system 503 may comprise any computer readable storage media readable by processing system 501 and capable of storing software 505. Storage system 503 may include volatile and nonvolatile, removable and non-removable media implemented in any method or technology for storage of information, such as computer readable instructions, data structures, program modules, or other data.

Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the storage media a propagated signal.

In addition to storage media, in some implementations storage system 503 may also include communication media over which software 505 may be communicated internally or externally. Storage system 503 may be implemented as a single storage device but may also be implemented across multiple storage devices or sub-systems co-located or distributed relative to each other. Storage system 503 may comprise additional elements, such as a controller, capable of communicating with processing system 501 or possibly other systems.

Software 505 may be implemented in program instructions and among other functions may, when executed by processing system 501, direct processing system 501 to operate as described herein for loading process 200 or 300. In particular, the program instructions may include various components or modules that cooperate or otherwise interact to carry out loading process 200 or 300. The various components or modules may be embodied in compiled or interpreted instructions or in some other variation or combination of instructions. The various components or modules may be executed in a synchronous or asynchronous manner, in a serial or in parallel, in a single threaded environment or multi-threaded, or in accordance with any other suitable execution paradigm, variation, or combination thereof. Software 505 may include additional processes, programs, or components, such as operating system software or other application software. Software 505 may also comprise firmware or some other form of machine-readable processing instructions executable by processing system 501.

In general, software 505 may, when loaded into processing system 501 and executed, transform a suitable apparatus, system, or device employing computing architecture 500 overall from a general-purpose computing system into a special-purpose computing system customized to facilitate data synchronization as described herein for each implementation. Indeed, encoding software 505 on storage system 503 may transform the physical structure of storage system 503. The specific transformation of the physical structure may depend on various factors in different implementations of this description. Examples of such factors may include, but are not limited to the technology used to implement the storage media of storage system 503 and whether the computer-storage media are characterized as primary or secondary storage, as well as other factors.

For example, if the computer-storage media are implemented as semiconductor-based memory, software 505 may transform the physical state of the semiconductor memory when the program is encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate this discussion.

It should be understood that computing architecture 500 is generally intended to represent an architecture on which software 505 may be deployed and executed in order to implement loading process 200 or 300 (or variations thereof) and optionally all or portions of an information management application. However, computing architecture 500 may also be suitable for any computing system on which software 505 may be staged and from where software 505 may be distributed, transported, downloaded, or otherwise provided to yet another computing system for deployment and execution, or yet additional distribution.

Communication interface system 507 may include communication connections and devices that allow for communication with other computing systems (not shown) over a communication network or collection of networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned communication media, network, connections, and devices are well known and need not be discussed at length here.

User interface system 509 may include a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 509. In some cases, the input and output devices may be combined in a single device, such as a display capable of displaying images and receiving touch gestures. The aforementioned user input and output devices are well known in the art and need not be discussed at length here. User interface system 509 may also include associated user interface software executable by processing system 501 in support of the various user input and output devices discussed above. Separately or in conjunction with each other and other hardware and software elements, the user interface software and devices may support a graphical user interface, a natural user interface, or the like.

Figure 8:
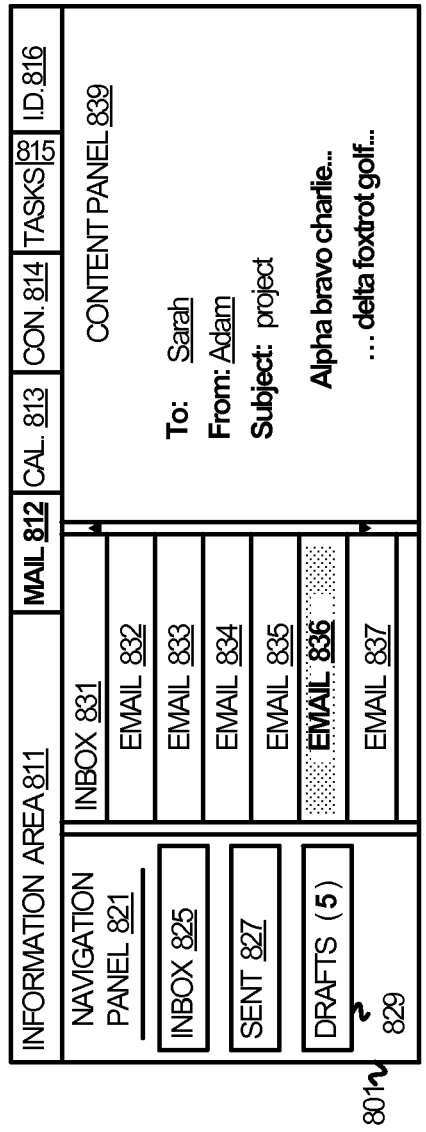
FIG. 8 illustrates a view of an information management application and an associated scenario in an implementation.
Figure 9:
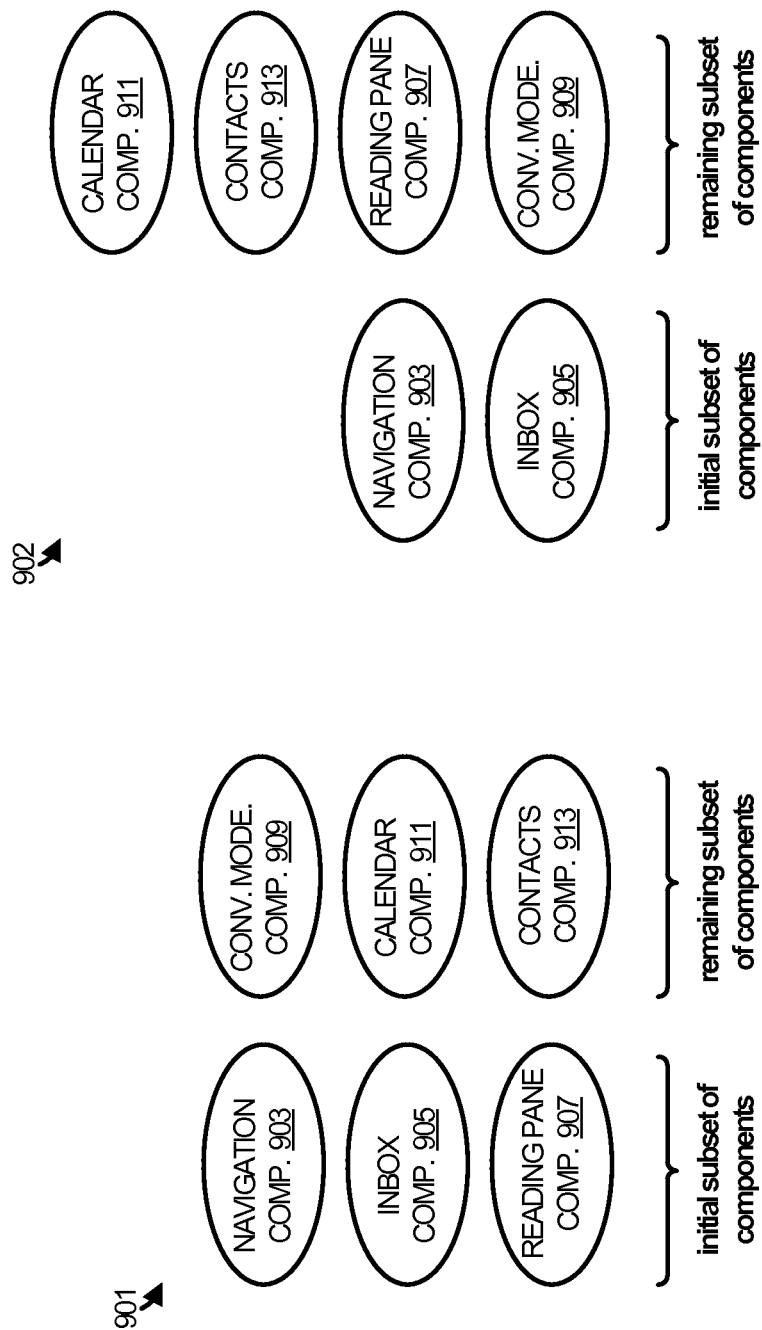
FIG. 9 illustrates two operational scenarios in various implementations.
Figure 10:
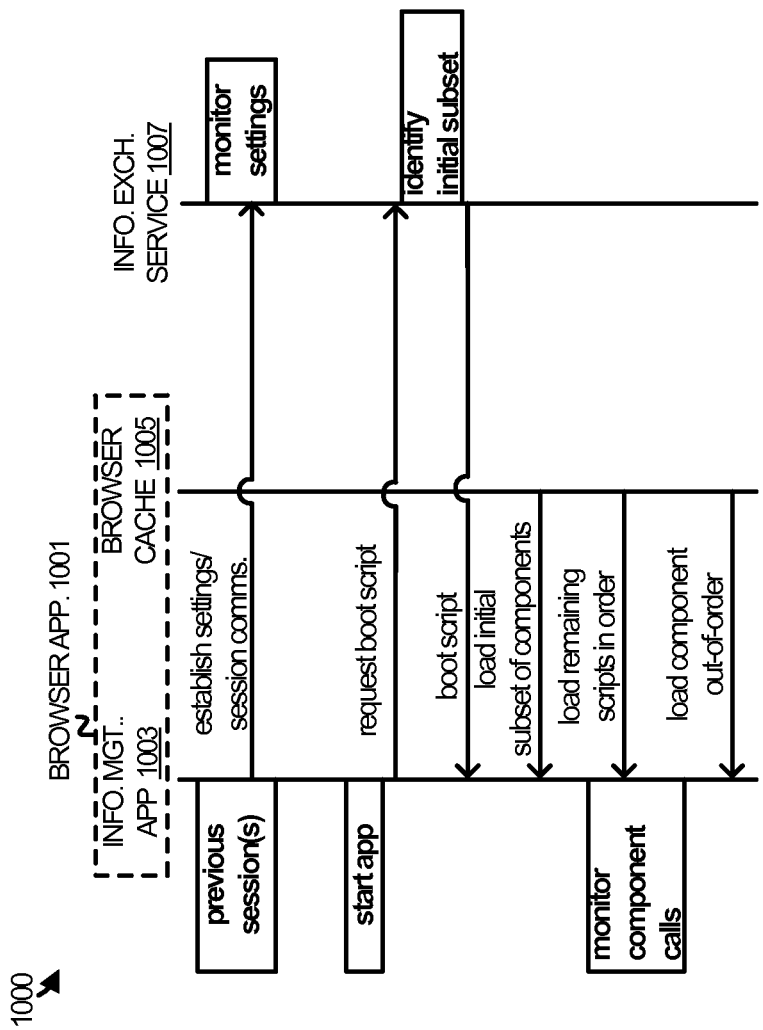
FIG. 10 illustrates an operational sequence in an implementation.

Turning now to FIGS. 6-10, various processes, operational scenarios, and operational sequences illustrate different implementations of some of the principals discussed with respect to FIGS. 1-5 above, as well as some additional concepts. In particular, FIG. 6 illustrates a loading process that may be implemented by an information management application, while FIG. 7 illustrates an exchange process that may be implemented in a service environment. FIG. 8 illustrates a view of an information management application while FIG. 9 and FIG. 10 illustrate various operational scenarios and sequences with respect to the view of the application.

Referring now to FIG. 6, a loading process 600 is illustrated, in accordance with which an information management application (411, 413, and 415) may operate when interfacing with an information exchange service (417, 419). In operation, the information management application starts (step 601). This may occur, for example, upon a user navigating to a particular website though which the information exchange service is accessed. In another example, a mobile application may be selected and launched. It may be appreciated that a variety of scenarios are possible for starting the application and may be considered within the scope of the present disclosure.

Upon starting, the information management application communicates with the information exchange service to request a boot script (step 603). The boot script includes information that identifies to the information management application an initial subset of components to load first, prior to loading other components. Upon receiving the boot script, the information management application loads the initial subset of components (step 605), possibly from a browser cache, from a remote server, or from any other source from which the components may be loaded.

After loading the initial subset of the components, the information management application may execute any of the initial subset. In the background, any remaining components are loaded (step 607). The remaining components may be loaded in accordance with a loading order. The loading order may be programmatically defined such that the information management application can load the components sequentially.

While the remaining components are loading in the background, the information management application monitors for any components to be called or invoked (step 609). When a component is invoked, the information management application determines whether or not the component has been loaded yet (step 611). This may be accomplished by, for example, referencing a list of components and their corresponding load state, by monitoring for an error condition that may occur when a component is called that is not yet loaded, or by any other suitable mechanism.

In the event that the called component is not yet loaded, the information management application loads the component out of order with respect to its place in the normal loading order (step 613). If the component is already loaded, then it can execute. Monitoring of the component calls may continue indefinitely or may possibly cease once all of the remaining components are loaded.

FIG. 7 illustrates an exchange process 700 in accordance with which an information exchange service (417, 419) may operate when interfacing with an information management application (411, 413, and 415). In operation, the information exchange service monitors for user preferences with respect to the information management application (step 701). For example, the information exchange service may monitor in which viewing mode the user tends to set their instance of an information management application. For example, a user may tend to switch their viewing mode from a list mode to a conversation mode with a great deal of regularity. In another example, a settings profile may be examined to determine mode that is specified in the settings.

Upon starting, an information management application communicates a request for a boot script to the information exchange service. The information exchange service receives the request (step 703) and, in response to it, identifies an initial subset of components to include in the boot script based on the monitored user preferences (step 705). For example, the components associated with a preferred viewing mode selected most frequently by the user may be included in the boot script. In another example, the components associated with the viewing mode identified in a settings profile may be included in the boot script.

The information exchange service then communicates the boot script to the information management application (step 707), thereby enabling the information management application to immediately load the initial subset of components. In this manner, the components loaded during an initial period of time are more likely to be relevant to a user interacting with the information management application compared with other solutions where components are loaded in a static, non-user specific manner.

FIG. 8 illustrates view 801 of an information management application in an implementation, while FIG. 9 illustrates two operational scenarios associated with the view 801. The following discussion therefore proceeds with respect to both FIG. 8 and FIG. 9.

The information management application considered with respect to FIG. 8 and FIG. 9 may include various components that, when executed, provide various features and functionality of the application. Some of the components may be associated with elements of a user interface to the information management application, of which view 801 provides one example. Depending upon how the view 801 is configured, various components associated with the elements in the view are executed to render its configuration.

In a simple example, when in a reading pane view, at least one component associated with presenting a reading pane is invoked. When in a conversation mode, at least one component associated presenting the conversation mode is invoked, and so on. However, having to download each and every component associated with an application can be cumbersome, as discussed above. Instead, the components of the information management application can be loaded in a bifurcated manner, such that an initial subset is identified and loaded prior to at least one remaining subset of components. In addition, the initial subset may be identified based at least in part on user preferences. Thus, if a user tends not to use the conversation mode, then components associated with that can be loaded with the remaining set. If a user tends to use the reading pane, then components associated with the reading pane can be loaded with an initial set of components. A variety of divisions of components are possible and may be considered within the scope of this disclosure.

Accordingly, FIG. 8 illustrates view 801 and its various elements, while FIG. 9 illustrates one scenario 901 in which some components are allocated to an initial set to be loaded, while another scenario 902 illustrates how the initial set can vary from user to user or situation to situation.

Referring again to FIG. 8, view 801 includes an information area 811 that may be used to display the name of the application or other suitable information. Information area 811 includes several selectable options that, when selected, launch the presentation of other views associated with other modules. In particular, mail option 812 corresponds to an email module, calendar option 813 corresponds to a calendar module, contacts option 814 corresponds to a contacts module, and tasks option 815 corresponds to a tasks module. Information area 811 also includes an identity option 816 representative of an identity of a user engaged with view 801. View 801 may include additional features and some of the features may be omitted. In addition view 801 is provided merely for illustrative purposes and not to limit the scope of the present disclosure.

View 801 also includes various panels having various email items and other email functionality rendered and available for interaction with a user. For example, navigation panel 821 includes, but is not limited to, various folders that a user may select in order to access their contents, such as an inbox folder 825, a sent folder 827, and a drafts folder 829. Depending upon which folder is selected, its corresponding contents may be displayed in the panel adjacent to navigation panel 821. It is assumed here for exemplary purposes that inbox folder 825 is selected. Accordingly, inbox 831 and its contents are displayed adjacent to navigation panel 821, including emails 832-837. It may be appreciated that the various panels and their contents could be arranged in a variety of ways and are not limited to just those disclosed herein.

Content panel 839, which is an example of a reading panel, provides a more detailed view of a selected item. For example, content panel 839 includes content associated with email 836, assumed for exemplary purposes to have been selected by a user for reading, editing, or the like. Other aspects may be included in content panel 839, such as in-line reply capabilities, that are well known and need not be discussed at length here.

The aforementioned elements of view 801 may correspond to various components that are loaded an executed to render view 801. Scenario 901 in FIG. 9 illustrates one example of how an initial set of components may include various components associated with the elements in view 801. Thus, an initial subset of components includes at least a navigation component 903 conesponding to navigation panel 821, an inbox component 905 conesponding to inbox 831, and a reading pane component 907 conesponding to content panel 839. The remaining subset of components in scenario 901 include at least a conversation mode component 909, a calendar component 911, and a contacts component 913. Which components are allocated to which subset may be determined dynamically based on user preferences, as discussed above with respect to various loading processes.

In scenario 902, a different allocation of components is illustrated to demonstrate the allocations may change from one user to the next or from one situation to the next possibly involving the same user.

In scenario 902, an initial subset of components includes at least a navigation component 903 conesponding to navigation panel 821 and an inbox component 905 conesponding to inbox 831. However, it may be appreciated that a reading pane component 907 corresponding to content panel 839 is allocated to the remaining subset. This may occur when, for example, a preference of a user is to disable or close the reading pane. Thus, the reading pane component 907 may be allocated to the remaining subset of components such that loading of it can occur in the background. The remaining subset of components in scenario 901 include at least a conversation mode component 909, a calendar component 911, and a contacts component 913, all of which may be loaded after the initial subset.

FIG. 10 illustrates an operational sequence 1000 to illustrate the various concepts described above in an implementation. Operational sequence 1000 involves a browser application 1001 within which an information management application 1003 may execute. In operation, a user accesses information exchange service 1007 during previous sessions in order to, for example, send and receive emails, schedule calendar events, and the like. During the previous sessions, session communications are exchange between information management application 1003 and information exchange service 1007. In addition, information indicative of user preferences with the information management application 1003 may also be communicated to information exchange service 1007. Information exchange service 1007 monitors the user preferences and stores the information for later analysis when determining which components to include in an initial subset.

Eventually, the information management application 1003 is closed as the user may move on to working with other applications or for some other reason. Upon returning to the application, it is started and a request for a boot script is communicated to information exchange service 1007. Information exchange service 1007 receives the request and responsively identifies an initial subset of components for loading by the information management application. Information exchange service 1007 communicates the boot script to the information management application 1003, which can then load the components.

Upon receiving the boot script, information management application 1003 loads the initial subset of components identified in the boot script from the browser cache 1005 or some other suitable component source. For instance, the components may also be loaded from a remote source, such as a server associated with the information exchange service 1007.

Once the initial subset of components are loaded, they can be executed within the context of the information management application 1003 running in the browser application 1001. However, other components may remain that need to be loaded. Accordingly, the remaining components are loaded in the background. While the remaining components are loaded, the information management application 1003 monitors for any components to be called that are not yet loaded. In the event a component is called that is not yet loaded, it can be retrieved and loaded from the browser cache 1005 or from some other suitable source.

It may be appreciated from the discussion above that, in some implementations, an information management application interfaces an information exchange service. The information management application upon starting communicates a request to the information exchange service to identify an initial subset of a plurality of components based at least in part on a user preference. In response to the information exchange service identifying the initial subset of the plurality of components, the information management application loads the initial subset of the plurality of components into an execution environment.

In some implementations, the execution environment is a browser application that renders a user interface to the information management application in a manner associated with the user preference. The information management application may include various modules and the user preference may be a mode in which to view a module of the plurality of modules. Examples of the modules include but are not limited to an email module, a calendar module, and a contacts module. The mode may be one of various modes in which to view the module.

In at last one example, the module is an email module and the mode is a conversation mode or a list mode. In another example, the module is a calendar module and mode is a month mode or a week mode.

In various implementations, the information management application loads each of a remaining subset of the various components in accordance with a loading order and loads any component not yet loaded but invoked by another component ahead of a corresponding place in the loading order.

While the various implementations described above generally refer to information management applications, it may be appreciated that the various advances described herein within the context of processes, operational scenarios, and other implementations may also be implemented in other types of applications. For example, the advances described herein may be implemented with respect to productivity applications, enterprise applications, gaming applications, and communication applications, as well as any other type of program application.

The functional block diagrams, operational sequences, and flow diagrams provided in the Figures are representative of exemplary architectures, environments, and methodologies for performing novel aspects of the disclosure. While, for purposes of simplicity of explanation, methods included herein may be in the form of a functional diagram, operational sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The included descriptions and figures depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A computing apparatus comprising:
   one or more computer readable storage media;
   at least one processor; and
   an information management application for interfacing with an information exchange service and comprising program instructions stored on the one or more computer readable storage media, wherein the program instructions, when executed by the at least one processor, direct the at least one processor to at least:
   upon starting the information management application, communicate a request to the information exchange service to identify an initial subset of a plurality of components of the information management application for loading into the information management application based at least in part on a user preference associated with the plurality of components and established with respect to the information management application;
   in response to the information exchange service identifying the initial subset of the plurality of components, load the initial subset of the plurality of components into an execution environment;
   after loading the initial subset of the plurality of components, attempt to load each of a remaining subset of the plurality of components into the execution environment in accordance with a loading order; and
   when a component in the remaining subset of the plurality of components is invoked before being loaded, load the component out of order with respect to a corresponding place in the loading order for the component.

2. The computing apparatus of claim 1 wherein the execution environment comprises a browser application that, when executed by the at least one processor, processes at least a portion of the initial subset of the plurality of components to render a user interface to the information management application in a manner associated with the user preference.

3. The computing apparatus of claim 2 wherein the information management application comprises a plurality of modules and wherein the user preference comprises a mode in which to view a module of the plurality of modules.

4. The computing apparatus of claim 3 wherein the plurality of modules comprises an email module, a calendar module, and a contacts module, and wherein the mode comprises one of a plurality of modes in which to view the module.

5. The computing apparatus of claim 4 wherein the module comprises the email module and wherein the plurality of modes comprises a conversation mode and a list mode.

6. The computing apparatus of claim 4 wherein the module comprises the calendar module and wherein the plurality of modes comprises a month mode and a week mode.

7. The computing apparatus of claim 1 further comprising the at least one processor coupled with the one or more computer readable storage media and configured to execute the program instructions and wherein the program instructions further direct the at least one processor to attempt to load each of a remaining subset of the plurality of components in accordance with a loading order and load any component not yet loaded but invoked by another component ahead of a corresponding place in the loading order.

8. A method of operating a service environment to facilitate an information exchange service with respect to an information management application, the method comprising:
   receiving a request from the information management application for a boot script in accordance with which to load at least a portion of a plurality of components;
   identifying based at least in part on a user preference established with respect to the information management application an initial subset of the plurality of components to load from a staging environment to a local environment;
   in response to identifying the initial subset of the plurality of components, inserting into the boot script information that identifies to the information management application the initial subset of the plurality of components to load first, prior to loading any others of the plurality of components;
   communicating the boot script to the information management application;
   loading the initial subset of the plurality of components into an execution environment;
   after loading the initial subset of the plurality of components, attempting to load each of a remaining subset of the plurality of components into the execution environment in accordance with a loading order; and
   when a component in the remaining subset of the plurality of components is invoked before being loaded, loading the component out of order with respect to a corresponding place in the loading order for the component.

9. The method of claim 8 wherein the local environment comprises a browser application that processes at least a portion of the initial subset of the plurality of components to render a user interface to the information management application in a manner associated with the user preference.

10. The method of claim 9 wherein the information management application comprises a plurality of modules and wherein the user preference comprises a mode in which to view a module of the plurality of modules.

11. The method of claim 10 wherein the plurality of modules comprises an email module, a calendar module, and a contacts module, wherein the mode comprises one of a plurality of modes in which to view the module.

12. The method of claim 11 wherein the module comprises the email module and wherein the plurality of modes comprises a conversation mode and a list mode.

13. The method of claim 11 wherein the module comprises the calendar module and wherein the plurality of modes comprises a month mode and a week mode.

14. A method of operating a computing system to facilitate loading of an information management application, the method comprising:

upon starting the information management application, communicating a request to an information exchange service to identify an initial subset of a plurality of components of the information management application for loading into the information management application based at least in part on a user preference associated with the plurality of components and established with respect to the information management application;

in response to the information exchange service identifying the initial subset of the plurality of components, loading the initial subset of the plurality of components into an execution environment;

after loading the initial subset of the plurality of components, attempt to load each of a remaining subset of the plurality of components into the execution environment in accordance with a loading order; and when a component in the remaining subset of the plurality of components is invoked before being loaded, load the component out of order with respect to a corresponding place in the loading order for the component.

15. The method of claim 14 wherein the execution environment comprises a browser application and wherein the method further comprises, in the browser application, executing at least a portion of the initial subset of the plurality of components to render a user interface to the information management application in a manner associated with the user preference.

16. The method of claim 15 wherein the information management application comprises a plurality of modules and wherein the user preference comprises a mode in which to view a module of the plurality of modules.

17. The method of claim 16 wherein the plurality of modules comprises an email module, a calendar module, and a contacts module, and wherein the mode comprises one of a plurality of modes in which to view the module.

18. The method of claim 17 wherein the module comprises the email module and wherein the plurality of modes comprises a conversation mode and a list mode.

19. The method of claim 17 wherein the module comprises the calendar module and wherein the plurality of modes comprises a month mode and a week mode.

20. The method of claim 14 further comprising attempting to load each of a remaining subset of the plurality of components in accordance with a loading order and loading any component not yet loaded but invoked by another component ahead of a corresponding place in the loading order.

* * * * *